Feb. 17, 1970  R. N. FREEDMAN  3,495,587
LIQUID DISCHARGE APPARATUS
Filed March 28, 1967  4 Sheets-Sheet 1

INVENTOR.
ROBERT N. FREEDMAN
BY
Rackenbach & Siegel
ATTORNEYS

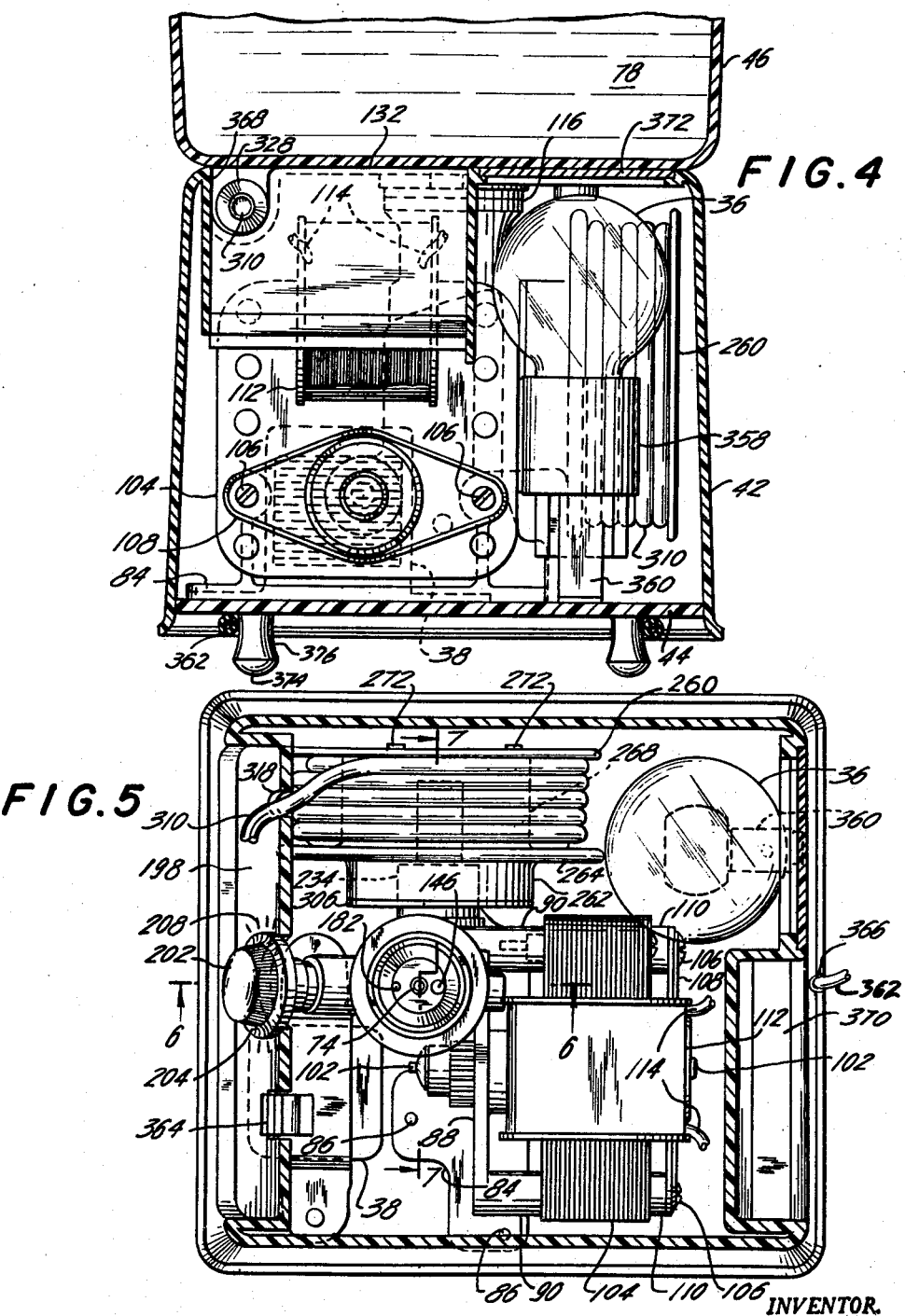

Feb. 17, 1970 R. N. FREEDMAN 3,495,587
LIQUID DISCHARGE APPARATUS
Filed March 28, 1967 4 Sheets-Sheet 3
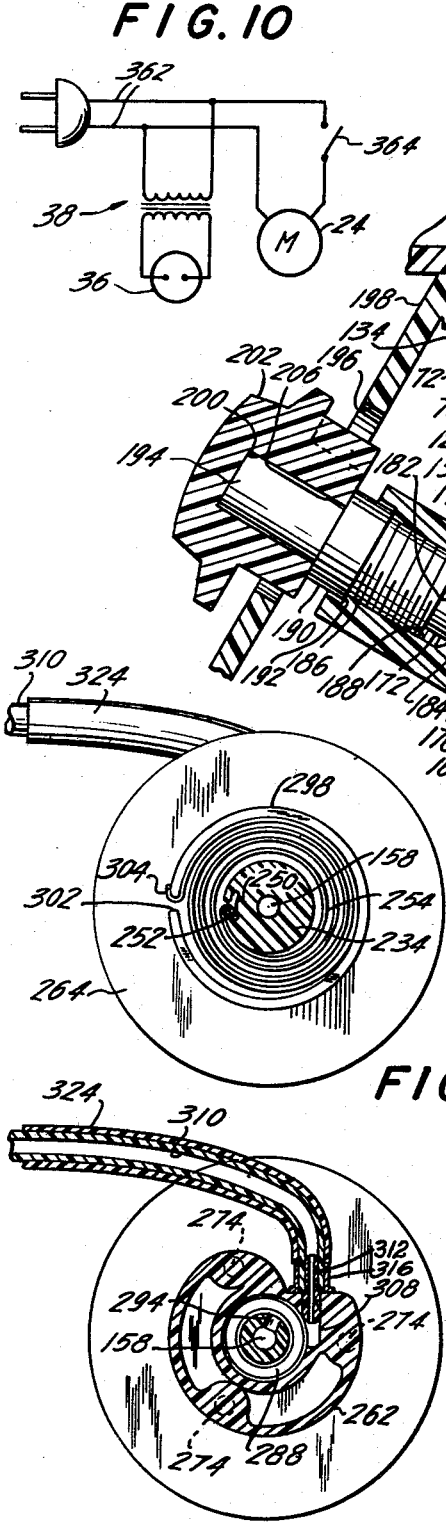
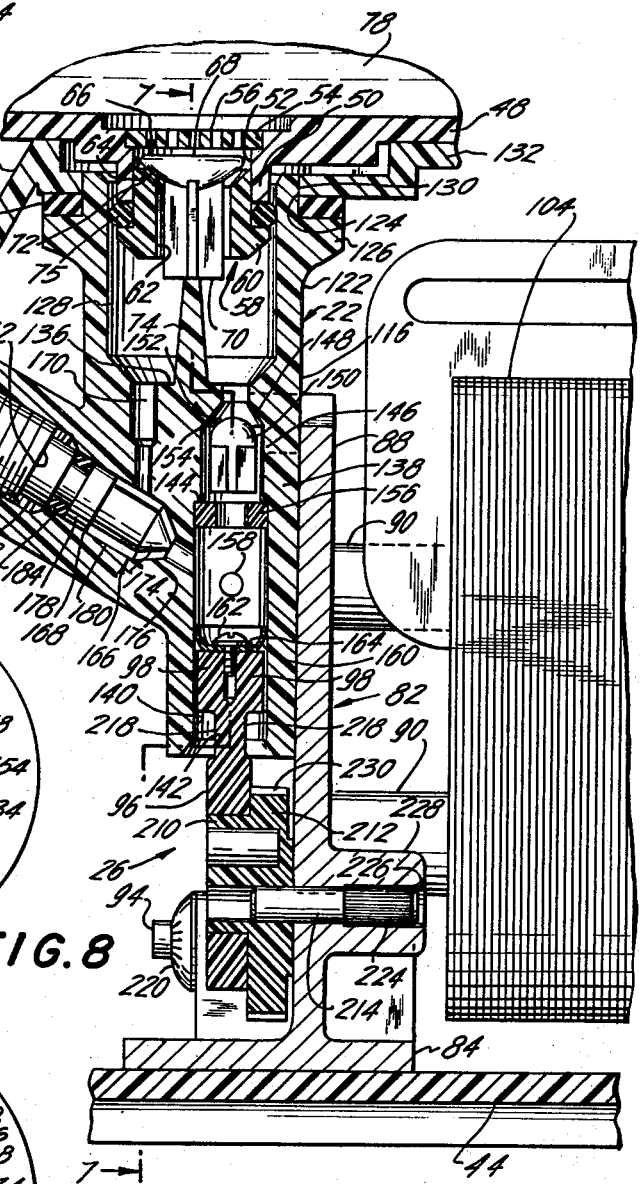
INVENTOR.
ROBERT N. FREEDMAN
BY Lackenbach & Siegel
ATTORNEYS Feb. 17, 1970 R. N. FREEDMAN 3,495,587
LIQUID DISCHARGE APPARATUS
Filed March 28, 1967 4 Sheets-Sheet 4
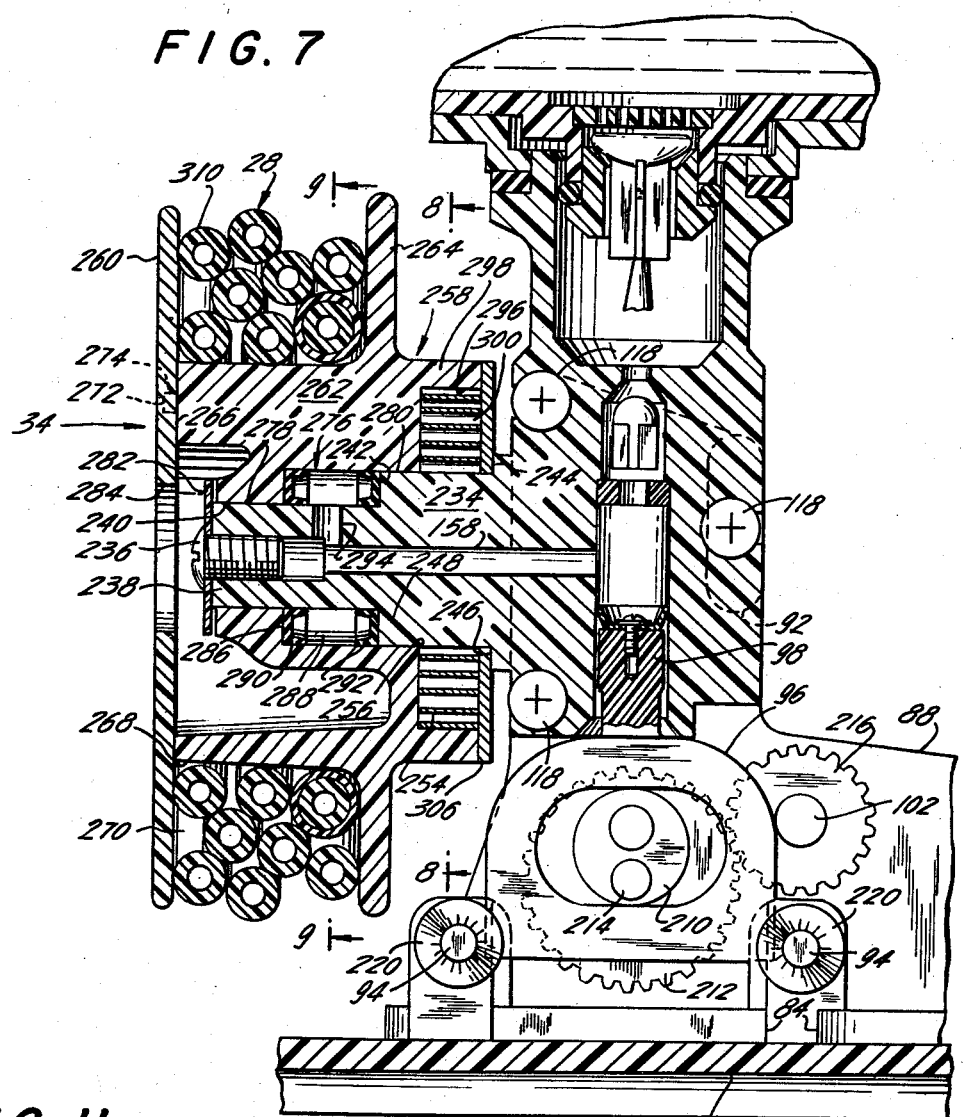
INVENTOR.
ROBERT N. FREEDMAN
BY
ATTORNEYS United States Patent Office 3,495,587
Patented Feb. 17, 1970

3,495,587
LIQUID DISCHARGE APPARATUS
Robert N. Freedman, Great Neck, N.Y., assignor to Endura Appliance Corporation, Freeport, N.Y., a corporation of New York
Filed Mar. 28, 1967, Ser. No. 626,441
Int. Cl. A61h 9/00; A61m 1/00
U.S. Cl. 128—66    33 Claims

ABSTRACT OF THE DISCLOSURE

Apparatus for providing an easily directed discharge of a liquid, such as water, mouthwash, or the like, especially for cleaning, massaging and stimulating teeth and adjacent tissues by impingement thereagainst comprising, in combination, a housing, means disposed within said housing for pressurizing a quantity of such liquid, means for conveying the pressurized liquid outwardly of said housing and for enabling the direction of discharge from the outward end thereof to be readily manipulated or controlled, means for regulating the flow of such liquid through said conduit means, means for retracting said conduit means relative to said housing and means for providing disinfecting and deodorizing emissions.

---

Figure 1:
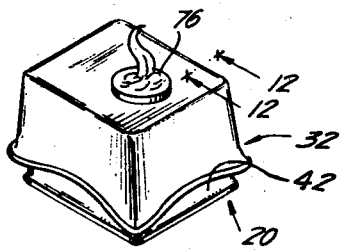

This invention relates generally to liquid discharge apparatus, and, more particularly, to liquid discharge apparatus for discharging a liquid under pressure from a nozzle, especially for providing a cleaning and massaging action to teeth and gum or gingival tissues.

It has previously been suggested to utilize a liquid discharge, either comprising water, an antiseptic solution, a mouthwash solution, or the like discharged at relatively high velocity from a restricted nozzle to impinge against teeth and adjoining gum tissues to clean the teeth and to massage and stimulate the adjoining gum and gingival tissues. Apparatus for this purpose which have heretofore been available have been relatively cumbersome to utilize, noisy in operation and difficult to maintain and clean or sanitize.

Acordingly, it is a primary object of the present invention to provide improved apparatus for providing a liquid discharge adapted for cleaning, massaging and stimulating teeth and gum and gingival tissues.

Another primary object of the present invention, in addition to the foregoing object, is to provide such apparatus which is easily manipulated and used and which is easily maintained, cleaned, and sanitized.

Yet another primary object of the present invention, in addition to each of the foregoing objects, is to provide such apparatus which is economical to manufacture.

A further primary object of the present invention, in addition to each of the foregoing objects, is to provide such liquid discharge apparatus which is highly efficient in operation.

A still further primary object of the present invention, in addition to each of the foregoing objects, is to provide such apparatus with means for providing sanitizing and germicidal emissions.

A yet further primary object of the present invention, in addition to each of the foregoing objects, is to provide such apparatus with a plurality of interchangeable jet tips.

Another and yet still further primary object of the present invention, in addition to each of the foregoing objects, is to provide liquid discharge apparatus comprising a unitary pump and reel assembly.

The invention resides in the combination, construction, arrangement and disposition of the various component parts and elements incorporated in improved liquid discharge apparatus constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 2:
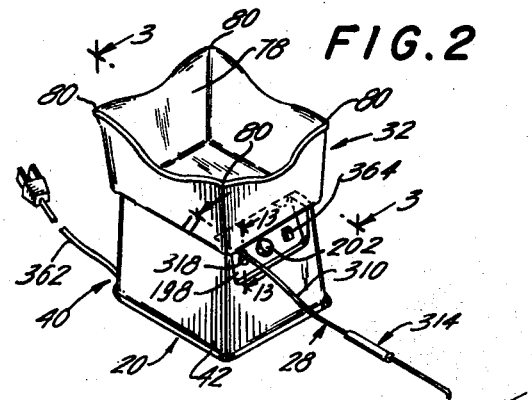
Figure 3:
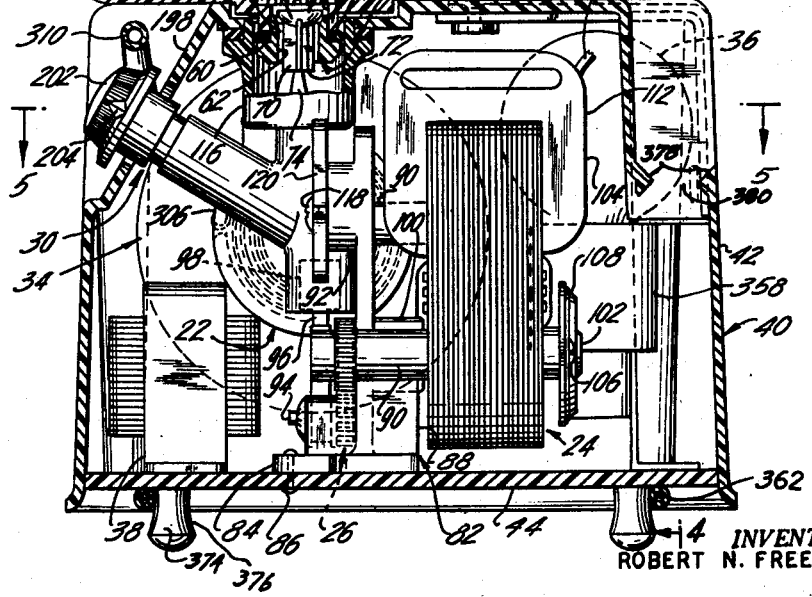

In the drawing:
FIG. 1 is an isometric view of liquid discharge apparatus constructed in accordance with the principles of the present invention shown in the closed or storage position thereof;
FIG. 2 is an isometric view, similar to FIG. 1, showing the liquid discharge apparatus in the operative configuration thereof;
FIG. 3 is an elevational cross-sectional view taken along line 3—3 of FIG. 2;
FIG. 4 is an elevational cross-sectional view taken along line 4—4 of FIG. 3;
FIG. 5 is a cross-sectional plan view taken along line 5—5 of FIG. 3;
FIG. 6 is a partial elevational enlarged cross-sectional view taken along line 6—6 of FIG. 5;
FIG. 7 is a partial elevational cross-sectional view taken along line 7—7 of FIG. 6;
FIG. 8 is a partial elevational sectional view taken along line 8—8 of FIG. 7;
FIG. 9 is a partial elevational cross-sectional view taken along line 9—9 of FIG. 7;
FIG. 10 is a schematic electrical wiring diagram for the apparatus of the present invention;
FIG. 11 is an enlarged partial cross-sectional view taken along line 11—11 of FIG. 2;
FIG. 12 is a partial cross-sectional elevational view taken along line 12—12 of FIG. 1; and
FIG. 13 is an enlarged illustration taken along line 12—12 of FIG. 2.

With reference now to the drawing, there is shown and illustrated liquid discharge apparatus constructed in accordance with the principles of the present invention and designated generally by the reference character 20.

The liquid discharge apparatus 20 comprises a pump assembly 22 operatively associated with an electric motor 24 by means of a transmission 26 and a discharge conduit 28. The liquid discharge apparatus 20 further comprises valve means 30 for regulating the rate of flow through the discharge conduit 28, a container assembly 32 adapted to contain a quantity of liquid, such as water, mouthwash solution, antiseptic solution, or the like to be supplied by the pump assembly 22 to the discharge conduit 28, a reel assembly 34 adapted to hold the discharge conduit 28, sanitizing means, such as an ozone or ultraviolet generating lamp 36 and a transformer ballast 38 for energizing the ozone or ultarviolet lamp 36. A housing assembly 40, comprising a housing member 42 and a base plate 44 encloses all of the operating parts of the liquid discharge apparatus 20. The container assembly 32 is further adapted to be associated with the housing assembly 40 in an inverted position, as shown in FIG. 1 to provide a cover therefor.

The container assembly 32 comprises an open topped generally rectangular container member 46, the bottom wall 48 thereof being provided with a downwardly extending annular flange 50 and an outlet bore or passage 52 extending therethrough. The bottom wall 48, adjacent the outlet bore or passage 52 is provided with a counterber 54 adapted to engage a generally circular apertured disk or screen 56. An outlet member 58, of generally cylindrical configuration provided with a generally annularly radially outwardly extending flange portion 60 is secured with the flange 50 and within the outlet bore or passage 52 in spaced apart relationship to the apertured disk or screen 56. The outlet member 58 is provided with a longitudinally extending generally cylindrical bore or passage 62, with the upper end portion of the outlet member 58 being of generally conical configuration to define a check valve seat 64. A container check member 66 having an enlarged head portion and an elongate stem 70 is movably positioned within the bore 60, with the enlarged head portion 68 thereof being positioned generally between the apertured disk or screen 56 and the outlet member 58. The enlarged head portion 68 is provided with a generally spherical or constant curvature lower surface 72 adapted to sealingly engage the seat 64 of the outlet member 58 when the container assembly 32 is disassociated from the housing assembly 40 and to be lifted upwardly out of sealing contact with the seat 64 upon association of the container assembly 32 with the housing assembly 40 by means of an upward force being applied to the stem 70 thereof, as by means of an actuating spike or projection 74, as shown in FIGS. 3, 6 and 7. Sealing means, such as an O-ring 75 is also provided, as by being positioned between the downwardly annularly extending flange 50 and the generally radially extending flange portion 60 of the outlet member 58. A cap 76 is adapted to engage the bottom wall 48 of the container 46 in the inverted position thereof to close the outlet bore or passage 52 thereof.

Accordingly, the container assembly 32 is capable of holding therein a quantity of liquid 78 and supplying the liquid to the pump assembly 22 through the outlet bores or passages 52 and 62, past the check valve member 66 when the container assembly 32 is operatively associated with the housing assembly 40, and to maintain the quantity of liquid 78 within the container assembly 32, without leakage through the outlet bores or passages 52 and 62 when the container assembly 32 is disassociated from the housing assembly 42. Accordingly, the container assembly 32 may be filled with the quantity of liquid 78 while disassociated from the housing assembly 42, assembled with the housing assembly 42 without loss, leakage, or spillage of the quantity of liquid 78 and, after use, the container assembly 32 may be disassociated from the housing assembly 42 while still containing therewithin some of the liquid 78 for disposal, storage, or the like, again, without there being any spillage, leakage, or dripping of the liquid 78 therefrom. Furthermore, the container 46 is so configured, as shown, as to enable the ready and simple storage of the liquid 78, in a bottle, jar, or other closed container, since the corners of the container 46 effectively define pouring spouts, as indicated at 80.

A support bracket 82, fabricated of any desired material, such as, for example, die cast Zamac is structurally associated in generally upstanding relationship with the base plate 44, which likewise may be fabricated of substantially any desired material, such as aluminum. The bracket casting 82 comprises a generally horizontally extending base portion 84 to enable structural association thereof with the base plate 44, as by means of rivets 86, or the like, and a generally upstanding portion 88 generally perpendicularly integrally formed with the base portion 84. The upstanding or generally vertically extending portion 88 is provided with a plurality of generally horizontally extending lugs or studs, a plurality of lugs 90 extending from one side thereof to support the motor 24, a second set of lugs 92 extending from the opposite side thereof to support the pump assembly 22, a third set of lugs 94 extending from the pump side of the upstanding portion 88 to provide bearing support to a slide member 96 structurally associated with the piston 98 of the pump assembly 22 and a bearing support lug 100 for rotatably supporting the rotor 102 of the motor 24. The motor support lugs 90 support the stator 104 of the electric motor 24.

The electric motor 24 may be of any desired configuration and construction, and may, for example, be mounted with the motor support lugs 90, as by screws 106 extending through the stator laminations 104 and into engagement with apertures provided in the motor support lugs 90. One end of the armature 102, as hereinbefore pointed out, preferably is rotatably supported by bearing means, not shown, provided in the bearing support lug 100 of the bracket casting 82. The other end of the rotor 102 may be rotatably supported, for example, by an outboard bearing assembly 108 structurally associated with the stator 104 by means of spacers 110 and the stator support screws 106. The outboard bearing assembly 108 may be of any desired construction, but preferably, comprises a self-aligning, permanently lubricated bearing for the outboard end of the rotor 102. The motor 24, in accordance with conventional practice, further comprises a field coil 112 having lead wires 114 operatively associated therewith.

The pump assembly 22 comprises a pump housing 116 molded, for example, from Delrin, or the like, structurally associated with the upstanding portion 88 of the bracket casting 82, as by means of a plurality of screws 118 engaged with bores provided in the pump support lugs 92 of the bracket casting 82 and with apertured flanges 120 integrally formed as a part of the pump housing 116. The pump housing 116 comprises an inlet portion 122 having a generally annular cross section defining an annular generally upstanding neck portion 124, a generally laterally extending annular flange 126 adjacent thereto and a generally cylindrical inlet chamber 128. The inlet chamber 128 is adapted to sealingly receive therewithin the outlet 58 of the container assembly 32, the O-ring 75 thereof sealingly engaging the generally cylindrical wall defining the inlet chamber 128. The neck portion 124 of the inlet portion 122 of the pump assembly 22 is adapted to engage a generally circular aperture 130 provided in the top wall 132 of the housing member 42. Sealing means, such as a rubber washer 134, preferably formed of an ozone resistant synthetic rubber, or the like, is provided, as by being positioned exteriorly of the neck portion 124 of the pump housing 122 and between the top wall 132 of the housing member 42 and the flange portion 126 of the pump housing 122. The actuating spike or projection 74 extends generally centrally upwardly from the bottom 136 of the inlet chamber 128 to engage the stem 70 of the container check member 66 to move the spherical lower surface thereof out of engagement with the seat 64 and permit the flow of liquid 78 therethrough when the container assembly 32 is operatively positioned or associated relative to the housing assembly 40.

The pump assembly 22 further comprises a pumping portion 138 disposed generally beneath the inlet portion 122. The pumping portion 138 comprises a generally cylindrical bore 140 extending from the lower end 142 of the pump housing 116 terminating at a shoulder 144 generally longitudinally centrally of the pump housing 116. The piston 98 is adapted to be reciprocated within the bore 140 by the motor 24, transmission 26 and slide member 96 to provide the pumping action. An inlet passage 146 extends between the shoulder 144 of the bore 140 and the bottom 136 of the inlet chamber 128 to provide fluid communication therebetween. The inlet passage 146 is so configured and arranged as to provide a generally conical upwardly disposed seat 148 for sealing cooperation with a check member 150 to define therewith an inlet check valve 152. The check valve member 150 is, for example, provided with a generally spherical surface 154 for engagement with the seat 148 and the check valve member 150 is adapted to reciprocate within the inlet passage 146, being retained therewithin by, for example, a retaining ring 156 which may, for example, be press fit within the bore 140 and against the shoulder 144. An outlet passage 158 is provided generally transversely outwardly of the bore 140 generally between the retaining ring 156 and the piston 98. To improve the pumping action of the reciprocating piston 98 within the bore 140, there may be provided a generally upwardly cupped member 160 disposed on the top or upper end of the piston 98, being secured therewith as by means of a screw 162 and washer 164.

Accordingly, with the container assembly 32 disposed in operative association with the pump assembly 22, and with the liquid 78 being present within the container assembly 32, the liquid 78 will flow downwardly through the apertured disk or screen 56, past the container check member 66 and into the inlet chamber 128, the O-ring 75 precluding loss or leakage of the liquid 78 outwardly thereof. The liquid will then flow into the bore 140, past the inlet check member 150 upon downward reciprocation of the piston 140 and cup member 160, the cupped member 160 precluding leakage of the liquid 78 past the piston 98. Upon upward reciprocation of the piston 98 and cupper member 160, the inlet check valve 152 will close, that is, the spherical surface 154 of the check valve member 150 will be moved upwardly into sealing engagement with the seat 148. The liquid 78 trapped between the cupped member 160 and the inlet checked valve 152 will accordingly be pressurized to flow outwardly through the outlet passage 158 for discharge through the discharge conduit 28, as will be described in more detail hereinafter.

The pump assembly 22 further comprises adjustable bypass means 166 for selectively, adjustably bypassing a portion of the liquid flow from the outlet passage 158 to the inlet chamber 128 and thereby control the flow of the liquid 78 into the discharge conduit 28. The flow bypass means 166 comprises a flow control bore 168 extending generally angularly upwardly and outwardly from the outlet passage 158 and a bypass bore or passage 170 extending generally vertically upwardly from the flow control bore 168 to the bottom 136 of the inlet chamber 128. A valve member 172 is disposed within the flow control bore 168 to vary the flow therethrough.

The valve member 172, for example, comprises a generally conical portion 174 adjustably disposed relative to a generally conical seating surface 176 provided within the flow control bore 168 generally adjacent the intersection thereof with the outlet passage 158. Generally outwardly of the conical portion 174, the valve member 172 comprises a generally annular flange 178 adapted to slidingly engage a generally cylindrical portion 180 of the flow control bore 168 to guide and center the conical portion 174 therewithin.

Outwardly of the annular flange 178, the valve member 172 is provided with an annular relieved portion 182 and sealing means, such as an O-ring 184, or the like, is disposed within the relieved portion 182 to prepreclude leakage of the liquid 78 outwardly thereof through the bore 168. The valve member 172 is further provided with means, such as an externally screw-threaded portion 186 adapted to engage with an internally screw-threaded potrion 188 of the bore 168 to enable accurate positioning of the conical portion 174 relative to the seating surface 176 and with stop means, such as an annularly extending flange 190 adapted to engage the pump housing 116, as at a shoulder or counterbore 192 to preclude jamming of the conical portion 174 of the valve member 172 against the seating surface 176. The outward end portion 194 of the valve member 172 is adapted to pass through an aperture 196 provided in a sloping or tilted front panel portion 198 of the housing member 42. The outer end portion 194 of the valve member 172 is further provided with a generally longitudinally extending groove or flattened portion 200. A knob 202, preferably comprising a pointed 204 is adapted to be structurally associated with the outer end portion 194 of the valve member 172, as by means of a spring 206. The sloped or included front portion 198 of the housing member 42 may be provided with indicia 208 for indicating the flow volume being discharged into the discharge conduit 28.

As hereinbefore pointed out, the piston 98 is adapted to be reciprocated within the bore 140 by the motor 24 through the transmission 26. The transmission 26 comprises the slide member 96, an eccentric driving pin 210, a driven gear 212, a driven gear shift 214, and a driving gear 216.

The driving gear 216 is preferably directly driven from the armature or rotor 102 of the electric motor 24, which, as heretofore pointed out, extends through the bracket casting 82. The driving gear 216 may be secured with the end portion of the armature shaft or rotor 102 in any desired manner, as by being press fit thereon, the armature shaft or rotor 102 being provided with straight knurling, or the like, to drivingly engage the driving gear 216.

The slide 96 and the piston 98 preferably comprise an integral member 218, the slide 96 defining the lower end portion and the piston 98 defining the upper end portion thereof. The piston-slide member 218 is guided for reciprocating movement by means of the piston portion 98 thereof engaging the bore 140 of the pump housing 122 and the slide portion 96 thereof being engaged between the slide bearing guides or lugs 94. The slide portion 96 is further retained against transverse movement, as by means of "push-nuts" 220 engaged with the lugs or slide bearing guides 94.

The slide portion 96 of the slide-piston member 218 is of generally rectangular configuration, and is provided with a generally transversely elongate slot 222 adapted to be engaged by the eccentric pin 210, whereupon rotation of the eccentric pin 210 will provide the requisite reciprocation to the piston-slide member 218.

The eccentrc pin 210 is structurally associated with the driven gear 212, as by being formed integrally therewith and extending transversely or axially outwardly therefrom. The eccentric pin 210 and the driven gear 212 are rotatably carried, as by the driven gear shaft 214 which in turn is structurally associated with the upstanding portion 88 of the bracket casting 82. For example, the driven gear shaft 214 may be provided with a straight knurled portion 224 press fit within an aperture or bore 226 extending generally horizontally through the upstanding portion 88 of the bracket casting 82. The upstanding portion 88 of the bracket casting 82 may further comprise an outwardly extending stud 228, as shown, to provide additionally rigidity and support to the dirven gear shaft 214. The driven gear 212 is longitudinally retaned relative to the driven gear shaft 214 and the driving gear 216, as by sliding contact of the opposite faces thereof with the back of the slide portion 96 and the front of the generally upstanding portion 88 (see FIG. 6). The teeth 230 of the driven gear 212 are operatively engaged with the teeth 232 of the driving gear 216. Accordingly, upon rotation of the armature or rotor shaft 102, the driving gear 216 will be rotated, the teeth 232 thereof engaging the teeth 230 of the driven gear 212. The rotation of the driven gear 212 will rotate the eccentric pin 210 about the axis of the driven gear shaft 214 and the resultant relative movement between the eccentric pin 210 and the slot 224 in the slide portion 96 will result in reciprocation of the piston portion 98 within the bore 140.

As hereinbefore pointed out, the bracket casting 82 is preferably fabricated of die cast Zamac. The driving gear 216 and the slide-piston member 218 are preferably fabricated of a material such as Delrin. The driven gear 212 and the eccentric pin 210, as hereinbefore pointed out, are preferably fabricated as one integral unit and preferably are fabricated of a material such as Teflon filled Delrin. The driven ger shaft 214 may, for example, comprise cold rolled steel. Hence, the bracket casting 82 and the driving gear 216 are of dissimilar materials, resulting in a very low frictional resistance to relative sliding movement therebetween. The driving gear 216 and the driven gear 212 are likewise of dissimilar material as are the driven gear 212, the driven gear shaft 214 and the bracket casting 82. Similarly, the driven gear 212 and the slide-piston member 218 are of dissimilar materials, as are the eccentric pin 210 and the piston-slide member 218. Accordngly, frictional losses or frictional resistances between the various components of the transmission are maintained at a minimum resulting in the efficient transmission of mechanical energy therethrough and long life durability thereto.

With particular reference now to FIGS. 7 and 8, the pump housing 116 further comprises a generally horizontally extending portion 234 having generally circular cross sections adapted to rotatably support thereon the reel assembly 34.

The outlet passage 158 extends generally axially through the generally horizontally extending portion or reel axle 234, the outlet passage 158 being closed at the outer end thereof, as by means of a screw 236. The outer end portion 238 of the reel axle portion 234 may be of reduced diameter, to define a generally cylindrical bearing surface 240 extending inwardly and terminating at a generally radially extending shoulder 242. The inner end portion of the reel axle or horizontally extending portion 234 is provided with a generally radially outwardly extending flange 244 to define a generally outwardly facing shoulder 246. The medial portion 248 of the reel axle 234 is provided with a generally longitudinally extending T-shaped slot 250 extending therealong adapted to engage a curved or hooked end portion of a motor spring 254. The remainder of the periphery of the medial portion 248 defines a second generally cylindrical bearing surface 256.

The reel assembly 34 comprises a reel body 258 of generally circular cross sections and an annular reel end plate 260. The reel body 258 comprises a core portion 262 and a flange portion 264 extending generally radially outwardly from a location generally longitudinally medially thereof, that is, in longitudinally spaced relationship to an outer end surface 266 thereof. The end plate 260 is structurally associated with the reel body 258 adjacent the outer end surface 266 so that the reel end plate 260, the flange 264 and the peripheral surface 268 of the reel body core portion 262 extending between the end plate 260 and the flange 264 define a generally annular, outwardly opening channel 270. The end plate 260 may be secured with the reel body 258 for rotation therewith in any convenient manner, as by being cemented with the outer end surface 266. The juncture between the end plate 260 and the outer end surface 266 may be further reinforced, as by a plurality of lugs 272 extending generally outwardly from the end surface 266 and engaged with a plurality of apertures 274 provided transversely in the end plate 260.

The reel core portion 262 is provided with a generally axially extending stepped bore 276 to define an outer internal generally cylindrical bearing surface 278 for rotative engagement with the bearing surface 240 and an inner generally cylindrical internal bearing surface 280 for rotative engagement with the bearing surface 256. The core portion 262 of the reel body 258 may be secured on the generally horizontally extending portion 234 of the pump housing 116 for rotational movement thereabout, as by means of a retaining washer 282, or the like, secured relative to the joint horizontally extending portion 234, as by means of the screw 236. A generally axial clearance hole 284 may be provided in the reel end plate 260 to enable assembly and positioning of the washer 282 and screw 236.

The stepped bore 276 of the reel body 258 further defines a generally annularly extending shoulder 286 adapted to be positioned in generally parallel spaced apart relationship to the shoulder 242 of the horizontally extending portion 234, the shoulders 286 and 284 and the bearing surfaces 240 and 280 accordingly defining a generally annular closed chamber 288 between the core portion 262 of the reel body 258 and the generally horizontally extending portion 234 of the pump housing 116.

Sealing means, such as a pair of opposed annular channel seals 290 and 292 are positioned within the chamber 286 to prevent fluid leakage outwardly between the bearing surfaces 240 and 278 and between the bearing surfaces 280 and 256. A generally radially extending passage 294 is provided within the generally horizontally extending portion 234 providing fluid communication between the outlet passage 158 and the chamber 286.

The inner end portion of the reel body core portion 262 is provided with a counterbore 296 to define a generally circular wall 298 in spaced, generally concentric relationship with the bearing surface 256 and defining therebetween a generally annular chamber 300. The motor spring 254 is disposed within the chamber 300. The generally circular wall 298 is provided with a longitudinally extending slot 302 adapted to engage a curved end portion or hook 304 provided at the outer end portion of the motor spring 254 (see FIG. 8). The curved end portion or hooks 252 and 304 of the motor spring 254, as shown, are accordingly directed in opposite directions, the hook 252 being engaged with the horizontally extending portion or axle 234 and the curved end portion or hook 304 being engaged with the circular wall 298 of the reel body 258. Hence, the motor spring 254 will bias the reel assembly 34 against rotation about the horizontally extending portion or axle 234 in one direction, and, is adapted to rotatably drive the reel assembly 34 about the generally horizontally extending portion or axle 234 in the opposite direction.

The motor spring 254 may be retained within the chamber 300 in any desired manner, as by means of a retaining washer 306 disposed adjacent the chamber 300 and between the circular wall 298 and the annular flange 244. The retaining washer 306 may be fabricated of substantially any desired material, and is preferably of an abrasive resistance material, such as steel, or the like, treated to prevent rusting thereof as by being dipped or otherwise coated with a rust preventative.

The discharge conduit 28 comprises the outlet passage 158, the radial passage 294, and the annular chamber 288, together with an outwardly extending bore 308 provided in the reel core portion 262 and extending outwardly from the annular chamber 288, a discharge hose 310, one end portion of which is structurally associated with the reel core portion 262 and maintained in fluid communication with the outwardly extending passage 308 thereof, as by means of a ferrule 312 and a nozzle assembly 314 structurally associated with the outer end portion of the discharge hose 310 (see FIGS. 7, 9 and 11).

The discharge hose 310, as hereinabove pointed out, is structurally associated with the reel core portion 262, as by means of the ferrule 312, fabricated, for example, of brass, or the like. The brass ferrule, may, for example, have one end portion thereof press fit within the passage 308, the inner end portion of the discharge hose 310 being engaged with the other end portion of the ferrule 312 and maintained positioned and disposed relative thereto, as by means of a hose clamp or ring 316. The discharge hose 310 is adapted to be wound up on the reel assembly 34 upon rotation thereof by the motor spring 254 and to be manually unwound therefrom, against the biasing of the motor spring 254 through a key slot shaped aperture 318 having an enlarged portion 320 adapted to enable the free passage therethrough of the discharge hose 310 and a narrow portion 322 adapted to squeeze or slightly compress the discharge hose 310 upon engagement therein to retain the discharge hose 310 withdrawn from the channel 270 of the reel assembly 34 and against the biasing action of the motor spring 254. The key slot shaped aperture 318 is preferably provided extending through the front sloped or tilted panel 198 of the housing member 42.

The discharge hose 310 is preferably fabricated of a non-reactive, flexible material, and, may, for example, be fabricated of polyurethane tubing. Stop means, such as an outer hose section 324 is provided to preclude excessive withdrawal of the discharge hose 310 and excessive strain being exerted on the ferrule 312. The outer tube 324 is of such a diameter that it will not pass through the key slot shaped aperture 318, even at the enlarged portion 320 thereof, but will, rather, engage or abut the inner surface of the sloping or inclined panel 198 upon full withdrawal of the discharge hose 310 therethrough as shown in FIG. 11. As hereinbefore pointed out, the discharge hose 310 may be engaged within the narrow portion 322 of the key slot shaped aperture 318 at any degree of withdrawal thereof, as shown in FIG. 13.

The nozzle assembly 314, as hereinbefore pointed out, is structurally associated with the outer end portion of the discharge hose 310. The nozzle assembly 314 comprises a nozzle 326 preferably removably securable with a handle 328 fixedly structurally associated with the free end of the discharge hose 310. The handle 328 may, for example, be of generally cylindrical configuration having a stepped bore 330 extending generally axially longitudinally therethrough. The discharge hose 310 may be secured with the handle 328 in any desired manner, as by the free end portion of the discharge hose 310 being inserted into the stepped bore 330 of the handle 328 and being secured therewith as by means of a brass ferrule 332 being press fit concentrically thereto. The nozzle 326 is of generally cylindrical elongate configuration, with the discharge end 334 thereof being angularly disposed relative to the longitudinal axis. The nozzle 326 is of hollow configuration, having a generally axial bore 336 extending therethrough. The bore 336, at the discharge end 334 of the nozzle 326 is preferably of a reduced cross section, so that the discharge end 334 defines an orifice 338 of small cross section enabling the discharge of a high velocity stream of liquid therefrom.

The nozzle 326 may be structurally associated with a nozzle handle 340 adapted to be removably snap fit in and out of engagement with the handle 328. The nozzle 326 and the nozzle handle 340 may be structurally associated in any convenient manner, as by means of a brass ferrule 342, or the like. The nozzle 326 and/or the nozzle handle 340 may be provided in a plurality of colors, or other easily identifiable marking means so that the liquid discharge apparatus 20 of the present invention may be supplied with a plurality of differently colored or otherwise easily identifiable nozzle and nozzle handle assemblies for use by different persons.

The handle 328 may, for example, be provided with a counterbore 344 at the outer end portion thereof provided with resilient sealing means, such as an O-ring 346 retained within the counterbore 344, as by means of a retaining ring 348. The nozzle handle 340 comprises, for example, a head portion 350 structurally associated with the nozzle 326 as hereinbefore pointed out, and, a stem portion 352 generally axially extending therefrom in opposed relationship to the nozzle 326. The stem portion 352 is adapted to be concentrically engaged within the bore 354 of the retaining ring 348 and the bore 330 of the handle 328. The stem portion 352 may be provided with an annularly extending groove 356 adapted to be engaged by the O-ring 346 to retain the nozzle handle 340 engaged with the handle 328.

If the discharge hose 310 is of sufficient flexibility, then the nozzle 326 will be readily manipulable within the oral cavity to direct the discharge thereof as desired, and, a swivel connection, or the like, is not required at the nozzle to handle juncture.

The ozone lamp 36, which further provides a source of ultraviolet radiation to sanitize, disinfect, and deodorize both the liquid discharge apparatus 20, and particularly the container assembly 32 and the nozzle assembly 314 and the surrounding atmosphere is positioned within the housing assembly 40. The ozone lamp 36 may, for example, be supported by a lamp socket 358 structurally associated with the base plate 44, as by a support bracket 360. The ozone lamp 36 may be energized from a line cord 362 (see FIG. 10) through the transformer ballast 38. The transformer ballast 38 and the ozone lamp 36 are preferably directly connected with the line cord 362, so that the ozone lamp 36 will remain energized at any time that the line cord 362 is connected with a source of power. The motor 24 is also connected with the line cord 362, but, a switch 364 which is preferably structurally associated relative to the tilted front panel 198 is connected in series therewith.

The container 46, as hereinbefore pointed out, is adapted to be inverted and assembled relative to the housing assembly 40, as shown in FIG. 1 to provide a cover for the liquid discharge apparatus 20. Preferably, the container 46, when in such inverted position, is spaced from the housing member 42 to provide a slight clearance space, for example, approximately $\frac{1}{32}$ inch, as shown in FIG. 12, to enable the free circulation of the ozone produced by the lamp 36 therebetween and outwardly thereof to sanitize and deodorize the apparatus and the surrounding room air. Means, such as a slot 366 is provided to enable the line cord 362 to extend outwardly of the housing member 42, as shown in FIG. 1. The housing member 42 is further so constructed and arranged as to provide a trough 368 extending along the top wall 132 thereof to enable storage of the nozzle assembly 314 therein, as shown in FIG. 4. Furthermore, a well 370 is provided adjacent the ozone lamp 36 for storage of extra nozzles 326, and for exposure thereof to the emissions of the lamp 36. Circulation of ozone produced by the lamp 36 outwardly of the liquid discharge apparatus 20 through apertures provided in the housing member 42 and the base plate 44. Access to the bulb 36 is provided by a removable closure 372 forming a part of the housing assembly 40 as also shown in FIG. 4.

The various component parts of the liquid discharge apparatus are predominantly fabricated of molded plastic, such as molded Delrin, or the like, for ease of cleaning, maintenance, high durability, and aesthetic appeal. Moreover, the entire pump assembly 22 and the motor 24 are mounted on and carried by the bracket casting 82, which is in turn structurally associated with the base plate 44. The transformer ballast 38 and the ozone lamp 36 are likewise carried by and structurally associated with the base plate 44. Hence, the housing member 42 may be readily removed for repair or maintenance of the operating components, if necessary. The container assembly 32 is readily removable from the housing assembly 40, without loss or leakage of liquid therefrom, and, the feeding of liquid from the container assembly 32 to the pump assembly 26 is wholly by gravity so that there is no priming of the pump assembly necessary, and liquid will be discharged from the nozzle substantially immediately upon energization of the motor 24.

In use, the container assembly 32 would be positioned upon the housing assembly 40, as shown in FIG. 2, and an appropriate quantity of liquid 78, such as water, mouthwash solution, antiseptic solution, or the like added thereto. The nozzle assembly 314 is then pulled to withdraw the discharge hose 310 from the housing assembly 40, unwinding the discharge hose from the reel assembly 34 and withdrawing the discharge hose through the key slot shaped aperture 318. When an appropriate length of discharge hose 310 has been so withdrawn, a simple upward movement thereof into the narrow portion 322 of the key slot shaped aperture 318 will secure the discharge hose 310 against retraction. The nozzle 326 would then be disposed within the oral cavity and the switch 364 turned on, energizing the motor 24 resulting in a discharge of the liquid 78 at high velocity through the nozzle orifice 338. The nozzle 326 may be readily manipulated, due to the flexibility of the discharge hose 310 to direct the high velocity liquid discharge as desired to substantially all portions of the oral cavity, and particularly to direct the discharge against the teeth and adjacent gingival and gum tissues, resulting in a thorough cleaning, massaging and stimulation thereof. The rate of discharge through the orifice 338 may be readily varied by rotating the adjustment knob 202 to bypass more or less of the liquid. After the switch 364 is turned off, a simple downward movement of the dicharge hose 310 to the enlarged portion 320 of the key slot shaped aperture 318 will enable the motor spring 254 to rewind the discharge hose 310 through the key slot shaped aperture 318 and onto the reel assembly 34. The container assembly 32 may then be readily removed from the housing assembly 40, without any leakage, spillage, or the like, for disposal of the liquid 78 remaining therein.

The liquid discharge apparatus constructed in accordance with the present invention, in addition to those features heretofore pointed out, possesses certain other advantages over similar apparatus heretofore known. Particularly, liquid discharge apparatus constructed in accordance with the principles of the present invention, is of unusual durability, the moving parts thereof being designed for exceptional efficiency, and all of the parts being designed for particularly long life, failure resistance and aesthetic appeal. Moreover, the liquid discharge apparatus of the present invention is specifically adapted for the easiest and most convenient operation and manipulation by a user.

As heretofore pointed out, the operating or moving parts are substantially entirely fabricated of Delrin, with adjacent moving parts being fabricated of slightly dissimilar materials, particularly Delrin and Teflon-filled Delrin so that frictional losses and wear will be at an absolute minimum. The housing member 42 and the container 32 are preferably fabricated of a highly durable material, specifically chosen for high impact resistance, such as styrene, which additionally provides an aesthetically appealing and easily cleaned surface.

From an operational and convenience standpoint, the liquid discharge apparatus of the present invention exhibits a number of special features. For example, the apparatus 20 may be supported on a plurality of feet 374 provided with a recessed portion 376 to enable any unused portion of the line cord 362 to be wrapped thereabout for storage as shown in FIGS. 1 and 4. Moreover, the feet 374 are preferably fabricated of a relatively soft material, such as rubber, or the like, both to provide a soft cushioning and slippage resistant function for the apparatus 20 and to increase the holding interaction between the feet 374 and the line cord 362 when any portion of the line cord 362 is wrapped thereabout. Additionally, the slot 366 is preferably sufficiently narrow as to grippingly engage the line cord 362 upon the line cord 362 being pressed therein to function as a clamp therefor to retain the wound-on portion of the line cord 362 engaged about the feet 374. Accordingly, the exposed length of line cord 362 may be readily changed by the user so that the aparatus 20 may be positioned at a desired location relative to an electric outlet without excessive length of line cord extending haphazardly therebetween.

As hereinbefore pointed out, the well 370 is adapted to hold extra nozzles while exposing the nozzles to the drying and germicidal actions of the lamp 36. Particularly, the well 370 comprises a plurality of opposed bottom ledge portions 378 to define therebetween a slot 380 in the bottom of the well 370. The opposed ledges 378 are adapted to engage the head 350 of the nozzle 340 with the nozzle tip 326 extending downwardly through the slot 380 enabling the extra nozzle tips to be supported within the well 370 with the tips 326 being freely supported for drying and exposure to the emissions of the lamp 36.

The keyhole shaped slot 318, as heretofore pointed out, is so configured as to enable relatively unimpeded movement of the discharge hose 310 through the enlarged potion 320 and to restrict movement of the discharge hose 310 upon engagement thereof with the restricted portion 322 of the key slot shaped aperture 318. The key slot shaped aperture 318 may also be disposed with the enlarged portion 320 generally upwardly of the restricted or narrow portion 322, rather than with the restricted or narrow portion 322 being above the enlarged portion 320, as shown. With the key slot shaped aperture 318 so inverted, that is, with the restricted or narrow portion 322 below the enlarged portion 320, the discharge hose 310 may be readily withdrawn relative to the aperture 318 by means of a generally outward and upward pull thereon, as would be the natural movement were the apparatus 20 discharged generally below the level of the oral cavity of a user, for example, on a ledge or shelf positioned at conventional sink height. With the apparatus 20 so configured and disposed, a positive and conscious movement would be required to move the discharge hose 310 into engagement with the narrow or restricted portion 322 of the key slot shaped aperture 318 and a generally upward and outward pull would be all that was required to release the discharge hose 310 from engagement with the restricted or narrow portion 322.

Moreover, if desired, for additional ease of movement of the discharge hose 310 through the enlarged portion 320 of the key slot shaped aperture 318, the enlarged portion 320 may be made substantially larger than the diameter of the discharge hose 310 and an enlarged head be provided on the handle 314 adapted to engage the sloped front panel 198 adjacent the key slot shaped aperture 318 upon inward movement of the discharge hose 310 and an enlarged ring, washer, or annulus threaded onto the discharge hose 310 generally interiorly of the front panel portion 198 for engagement by the outer hose 324 and the sloped front panel portion 198 upon outward movement of the discharge hose 310.

Moreover, in addition to the valve means 30 structurally associated with the pump assembly 22, there may be provided flow control means operatively associated with the discharge conduit means outwardly of the housing member 42, as by being disposed thereon adjacent the handle 314 for restricting or completely shutting off liquid flow or discharge through the outlet conduit. For example, a clamp type restrictor may be operatively associated with the discharge hose 310 generally adjacent the handle 314 for squeezing the walls of the discharge hose 310 toward each other to restrict or completely preclude the flow of fluid therethrough.

In addition to the simple, direct and exceptionally efficient transmission 26 for driving the pump assembly 22 from the electric motor 24, the pump assembly 22 is itself particularly constructed and arranged to efficiently provide the desired liquid discharge. Specifically, the pump assembly 22 is particularly designed for maximum efficiency, with minimal friction and a minimum of parts capable of wear or fatigue, and with substantially the entire liquid path comprising a non-reactive material, such as plastic. More specifically, the pump inlet is relatively unrestricted, and the inlet check valve member 150 is adapted to be moved towards and away from its seat 148 entirely by liquid pressures. The piston 98 is preferably spaced from the bore 140, being centered therewithin by the Teflon cupped member 160, which is the only reciprocating element in contact with the bore 140 of the pump housing 138. Hence, the Teflon cupped washer 160 engages the bore 140 of the pump housing 138 in only a relatively small area, contact between the piston 98 and the pump housing 138 being entirely eliminated. Moreover, as the cupped washer 160 is preferably fabricated of a material such as Teflon, with the pump housing 138 fabricated of a material such as Delrin, the parts which slide relative to one another are fabricated of similar materials, and, additionally, materials having a very, very low co-efficient of friction therebetween and exceptionally high resistance to abrasive wear. The Teflon washer 164 may be eliminated, if desired.

The pump assembly 22 as shown, utilizes the relatively restricted cross sectional area of the outlet bore 158, the valve 30, and the remainder of the discharge passages to prevent back-flow into the pumping chamber. Increased volumetric efficiency may be accomplished by supplementing the output restrictions by one-way or check valve means disposed on the discharge side of the pump. For example, a discharge check valve member may be disposed within the passage 158 adapted to seal the passage 158 generally upstream of the bore 294 during the intake stroke of the piston 98. Such a check valve member could, for example, be biased inwardly of the passage 158, as by means of a coil spring, or the like, disposed between such check valve member and the screw 236.

It is to be understood that terminology such as "upper," "lower," "upwardly," "downwardly," "inwardly" and "outwardly," as used in the preceding description and subjoined claims, along with other similar directional terminology, is to be construed and interpreted in its normal and accepted sense. However, such terminology is not to be construed or interpreted in a limiting sense either in the preceding description or the subjoined claims, since the same is used merely to facilitate an understanding of, and to clearly set forth and particularly define the present invention.

What is claimed is:

1. Apparatus for providing a discharge of a liquid, such as water, mouthwash, or the like, especially for cleaning, massaging and stimulating teeth and adjacent tissues by impingement thereagainst comprising, in combination, a pump housing, said pump housing comprising an elongate pump body portion provided with an inlet chamber and a generally longitudinally extending bore in fluid communication with one another, an elongate reel axle portion extending generally angularly outwardly of said pump portion, said reel axle portion being provided with an outlet passage in fluid communication with said bore adjacent said inlet chamber and an elongate valve body portion disposed generally obliquely to said bore, said valve body portion having bypass passages providing fluid communication between said outlet passage and said inlet chamber; a piston constructed and arranged for reciprocation within said bore; check valve means between said inlet chamber and said bore; valve core means associated with said valve body portion for adjustably restricting flow through said bypass passages; a reel rotatably supported on said reel axle portion; and conduit means for conveying liquid outwardly of said reel, said conduit means comprising a flexible hose having one end thereof structurally associated with said reel and passage means for providing fluid communication between said one end of said hose and said outlet passage.

2. Liquid discharge apparatus as defined in claim 1 wherein said last-mentioned passage means comprises rotatable seal means disposed between said axle portion and said reel.

3. Liquid discharge apparatus as defined in claim 1 wherein said flexible hose comprises polyurethane tubing.

4. Liquid discharge apparatus defined in claim 1 further comprising motor spring means structurally associated with said reel for rotating said reel to wind said flexible hose thereon.

5. Liquid discharge apparatus defined in claim 1 further comprising a nozzle assembly structurally associated with the other end of said flexible hose, said nozzle assembly being provided with a restricted discharge orifice.

6. Liquid discharge apparatus defined in claim 1 further comprising a nozzle assembly, said nozzle assembly comprising an enlarged generally cylindrical handle structurally associated with the other end of said flexible hose, an elongate nozzle having an angularly disposed discharge portion provided with a restricted discharge orifice and a nozzle handle structurally associated with said nozzle, said handle and said handle being constructed and arranged to be removably interengaged.

7. Liquid discharge apparatus defined in claim 6 wherein said last-mentioned passage means comprises rotatable seal means disposed between said axle portion and said reel together with motor spring means structurally associated with said reel for rotating said reel to wind said hose thereon.

8. Liquid discharge apparatus defined in claim 1 further comprising a bracket, said bracket having a generally upstanding portion and a base portion disposed generally perpendicular to each other, said pump housing being secured with said upstanding portion on one side thereof; a motor having a rotor and a stator, said stator being secured with said upstanding portion on the other side thereof, one end of said rotor being rotatably supported relative to said stator, the other end of said rotor extending through and being rotatably supported by a relative thereto for eccentric movement about said driven shaft extending therefrom on said one side thereof; and transmission means carried by said upstanding portion on said one side thereof for reciprocating said piston in response to rotation of said rotor and drive shaft.

9. Liquid discharge apparatus defined in claim 8 wherein said transmission comprises a driving gear structurally associated with said drive shaft for rotation therewith, a driven gear shaft structurally associated with said upstanding portion extending therefrom on said one side thereof generally parallel to said drive shaft, a driven gear rotatably supported by said driven gear shaft with the teeth thereof meshed with the teeth of said driving gear, a pin extending outwardly of said driven gear disposed relative thereto for eccentric movement about said driven gear shaft and a slide structurally associated with said piston, said slide being provided with an elongate slot extending generally laterally thereof and generally parallel to said upstanding portion, said pin being disposed within said elongate slot for driving engagement with said slide.

10. Liquid discharge apparatus defined in claim 9 further comprising guide means for restraining movement of said slide to a straight line path defined by the axis of said bore, said guide means comprising a plurality of lugs extending generally perpendicularly from said upstanding portion and radially extending flange means engaged with said lugs adjacent the free end portions thereof.

11. Liquid discharge apparatus defined in claim 9 wherein said driven gear and said pin are integrally fabricated of a material dissimilar to the materials of the driving gear and the slide.

12. Liquid discharge apparatus defined in claim 11 wherein said driven gear and pin are fabricated of a material having the characteristics of Teflon filled Delrin.

13. Liquid discharge apparatus defined in claim 11 wherein said driving gear and said slide are fabricated of a material having the characteristics of Delrin.

14. Liquid discharge apparatus defined in claim 13 wherein said driven gear and said pin are fabricated of a material having the characteristics of Teflon filled Delrin.

15. Liquid discharge apparatus defined in claim 8 further comprising a housing assembly, said housing assembly comprising a generally rectangular housing member having a generally open and unobstructed bottom and a base plate adaptetd to be secured therewith generally closing said open and unobstructed bottom, said base portion of said bracket being secured with said plate.

16. Liquid discharge apparatus defined in claim 15 further comprising sanitizing means disposed within said housing assembly, said sanitizing means being structurally assocated with said base plate.

17. Liquid discharge apparatus defined in claim 1 further comprising a housing assembly for enclosing at least said pump housing and said reel.

18. Liquid discharge apparatus defined in claim 17 wherein said housing assembly comprises a generally rectangular housing member having a sloped front panel portion provided with a plurality of apertures, one of said apertures being disposed to enable adjustment of said valve core means, another of said apertures enabling the passage therethrough of said flexible hose.

19. Liquid discharge apparatus defined in claim 18 wherein the hose aperture is of key-slot configuration having an enlarged portion and a restricted portion adjacent thereto, said enlarged portion enabling the free passage of said flexible hose therethrough and said restricted portion being adapted to engage said flexible hose to restrain movement of said hose relative to said front panel portion.

20. Liquid discharge apparatus defined in claim 18 further comprising radially outwardly extending stop means structurally associated with said flexible hose adjacent said one end thereof adapted to engage said front panel portion to limit the passage of said flexible hose through said hose aperture.

21. Liquid discharge apparatus defined in claim 20 wherein said stop means comprises a flexible tube disposed in overlying relationship to said flexible hose.

22. Liquid discharge apparatus defined in claim 17 further comprising a container assembly adapted to be positioned relative to said pump housing for providing a supply of liquid thereto, said container assembly being further adapted for inverted association relative to said housing to define a cover therefor.

23. Liquid discharge apparatus defined in claim 22 further comprising sanitizing means disposed within said housing assembly, said container member when disposed as cover for said housing assembly being generally slightly spaced therefrom enabling drying and sanitizing of the interior thereof.

24. Liquid discharge apparatus defined in claim 17 further comprising sanitizing means disposed within said housing assembly, said sanitizing means comprisng an ultraviolet and ozone generating bulb and means for energizing said bulb.

25. Liquid discharge apparatus defined in claim 24 wherein said housing member is provided with a generally horizontally extending trough for supporting the discharge end portion of said flexible hose in an inoperative or storage position for sanitizing exposure to the emissions of said bulb.

26. Liquid discharge apparatus defined in claim 24 wherein said housing member is provided with a storage well for supporting at least one discharge nozzle for sanitizing exposure to the emissions of said bulb.

27. Liquid discharge apparatus defined in claim 1 further comprising a container assembly adapted to be removably positioned relative to said pump housing for providing a supply of liquid thereto.

28. Liquid discharge apparatus defined in claim 27 wherein said container assembly comprises a container member having a bottom wall provided with an outlet aperture, an outlet flange extending downwardly from said bottom wall adjacent said outlet aperture adapted to extend into said inlet chamber of said pump housing, sealing means operatively associated for positioning between said outlet flange and said pump housing for precluding liquid flow outwardly therefrom and container check valve means adapted to permit the passage of liquid through said outlet aperture when said outlet flange is disposed in operative association with said pump housing and to preclude liquid passage therethrough upon disassociation thereof.

29. Liquid discharge apparatus defined in claim 1 further comprising a nozzle assembly adapted to be removably structurally associated with said flexible hose, a housing assembly having a sloped panel portion provided with a plurality of apertures for enabling the passage therethrough of said flexible hose and for enabling the adjustment of said valve core means, sanitizing means disposed within said housing assembly and a container assembly adapted to be removably positioned relative to said pump housing for providing a supply of liquid thereto, said container assembly being further adapted for inverted association relative to said housing to define a cover therefor.

30. Liquid discharge apparatus defined in claim 29 further comprising a motor for reciprocating said piston within said bore and electric circuit means for energizing said motor and said sanitizing means, said electric circuit means comprising a switch positioned relative to said front panel portion for selectively energizing said motor, said sanitizing means being adapted to be continuously energized.

31. Liquid discharge apparatus comprising, in combination, a pump comprising a housing having a bore and a piston adapted for longitudinal movement therewithin, said housing comprising a generally cylindrical portion; a reel comprising a hub having a generally cylindrical bore disposed in overlying relationship on said cylindrical portion and liquid conveying means for conveying the discharge of said pump outwardly thereof, said conveying means comprising a flexible conduit adapted to be wound on and off said reel and rotatable seal means disposed between said cylindrical portion and said hub for precluding the passage of liquid outwardly therebetween, said cylindrical portion and said hub being provided with passage means extending therebetween for connecting said pump with said flexible conduit.

32. Liquid discharge apparatus as defined in claim 31 further comprising a plurality of jet tips adapted to be interchangeably associated with the free end portion of said flexible conduit.

33. Liquid discharge apparatus as defined in claim 31 further comprising motor means for rotating said reel at least in a flexible conduit rewinding direction.

References Cited

UNITED STATES PATENTS

| 3,044,465 | 7/1962 | Anderson et al. |
| 3,044,473 | 7/1962 | Cover. |
| 3,393,673 | 7/1968 | Mattingly _____ 128—66 |

L. W. TRAPP, Primary Examiner

U.S. Cl. X.R.

128—234